(No Model.)  2 Sheets—Sheet 1.

J. W. GARDNER.
KNIFE AND FORK.

No. 300,356.  Patented June 17, 1884.

WITNESSES.  INVENTOR
Jas. F. DuHamel.  Joseph W. Gardner,
Walter S. Dodge.  by Dodge & Son,
  Attys.

(No Model.) 2 Sheets—Sheet 2.

J. W. GARDNER.
KNIFE AND FORK.

No. 300,356. Patented June 17, 1884.

WITNESSES:
Jas. F. DuHamel.
Walter S. Dodge.

INVENTOR:
Joseph W. Gardner,
by Dodge Son,
Attys.

UNITED STATES PATENT OFFICE.

JOSEPH W. GARDNER, OF SHELBURNE FALLS, MASSACHUSETTS.

KNIFE AND FORK.

SPECIFICATION forming part of Letters Patent No. 300,356, dated June 17, 1884.

Application filed August 4, 1883. (No model.)

*To all whom it may concern:*

Be it known that I, JOSEPH W. GARDNER, of Shelburne Falls, in the county of Franklin and State of Massachusetts, have invented certain Improvements in Table-Cutlery, of which the following is a specification.

My invention relates to knives and forks for table use and other purposes, and is designed as an improvement upon the one for which Letters Patent were issued to me, bearing date July 3, 1883, and numbered 280,399.

The present improvement consists in securing the blade or tines to the bolster by means of a transverse pin, preferably made slightly tapering, and in other features presently explained.

Figure 1:
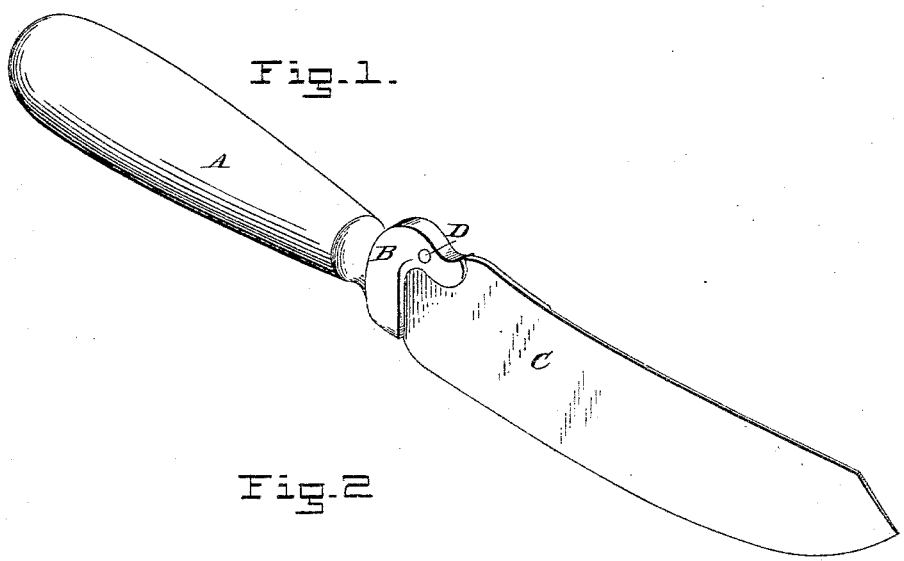
Figure 2:
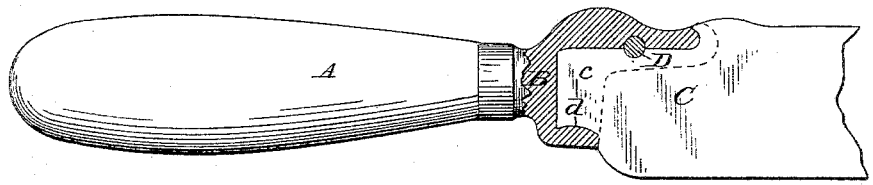
Figure 3:
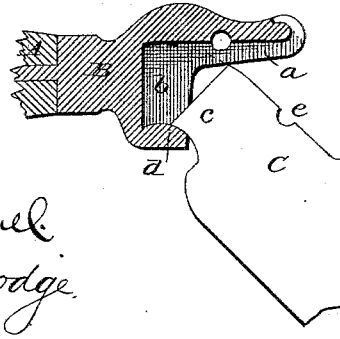
Figure 4:
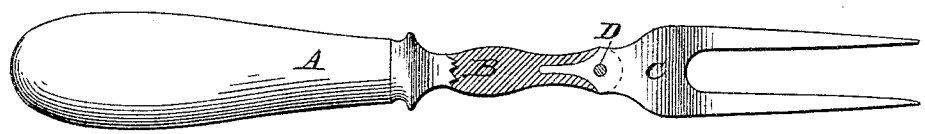
Figure 5:
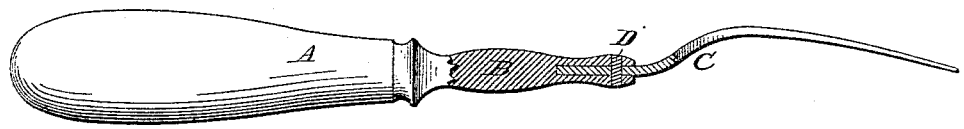
Figure 6:
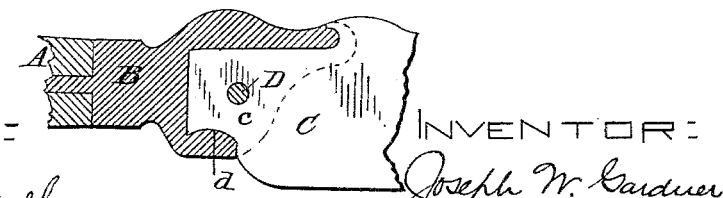

In the accompanying drawings, Figure 1 is a perspective view of a knife containing my improvements; Fig. 2, a vertical central longitudinal section of the same; Fig. 3, a similar view showing the manner of inserting the blade; Figs. 4 and 5, views showing the manner of securing the tines of a fork to the bolster, and Fig. 6 a view illustrating a slight modification.

A represents the handle of any suitable material and construction; B, the bolster, and C the detachable blade or tines. The bolster is made with a slot, $a$, to receive the inner end of the blade or tines, and with a seat or socket, $b$, to receive a projecting tang, $c$, formed on said end. This tang $c$ may be straight and merely shoved lengthwise into the socket $b$; or it may be curved or made hook-shaped, so as to hook into the socket and assist in retaining the blade or tines in place. To accomplish this latter object conveniently and effectively, the socket $b$ is made with an upper and an end wall of any suitable shape—straight walls answering as well as any—and with a curved lower wall, $d$, as shown. The curve of wall $d$ is advisably made of an arc of a circle struck from a point in advance of the rear end wall of the socket $b$, as indicated in Fig. 3, the upper wall of the socket or upper edge of the blade being shaped to permit the blade cut out on the same curve to swing about the curved wall $d$ as a pivot or center until carried to its seat, as indicated. When thus brought to place, the blade or tines are secured by a transverse pin, D, passing through the bolster and through a notch, $e$, in the blade or tine, as shown in Figs. 1, 2, and 3, or through a hole, as in Figs. 4, 5, and 6, the notch and hole being the equivalents of each other.

It will be seen that the construction thus set forth relieves the pin very materially of strain in using the knife or fork, and prevents, in a great measure, the wear thereof, which would otherwise occur. The pin is made slightly tapering, so that when driven to place it may bind sufficiently to prevent accidental displacement; and, if desired, the ends may be threaded and screwed into the bolster, though the construction shown and described is preferred. The taper of the pin also causes it to draw or force the blade back against the walls of the slot or cavity made for it in the bolster, and thus prevents any looseness which might otherwise occur, and which would materially affect the salability of the knife or fork. The slot in the bolster should be of barely sufficient width to receive the blade; or, if wider in the first instance, should be closed upon the blade by pressure after the blade is inserted, to prevent lateral play. The same construction may be applied to the fork; but I prefer to make the tines with merely a straight or tapered tang, as shown.

The construction herein described is materially cheaper than that before patented, and is otherwise more desirable.

I hereby disclaim in this application a transverse pin which merely serves to prevent the blade from dropping down, when locked in place, by a special locking-screw, as in my former patent above referred to.

Having thus described my invention, what I claim is—

1. In combination with handle A and bolster B, part C, having its end inserted in the bolster, and a locking-pin, D, passed transversely through the bolster and through part C, and serving to retain said part in place without the aid of other fastening.

2. In combination with a handle provided with bolster B, having slot $a$, and socket $b$, the latter formed with curved wall $d$, part C, curved to conform to wall $d$, whereby said part is adapted to move upon said wall as a center of motion, and thus to be swung into the socket $b$, and a transverse locking-pin, D, passing through the bolster and through part C, as shown, whereby part C is prevented from being withdrawn from the bolster without first withdrawing the pin.

JOSEPH W. GARDNER.

Witnesses:
SAMUEL L. TAYLOR,
B. RICHARDSON.